April 9, 1963  N. N. GOLDBERG  3,084,606
MOTORIZED DRIVE MECHANISM FOR ROLL FILM CAMERAS
Filed March 13, 1961  3 Sheets-Sheet 1

INVENTOR.
NORMAN N. GOLDBERG
BY
*Joseph G. Werner*
ATTORNEY

INVENTOR.
NORMAN N. GOLDBERG
BY Joseph G. Werner
ATTORNEY

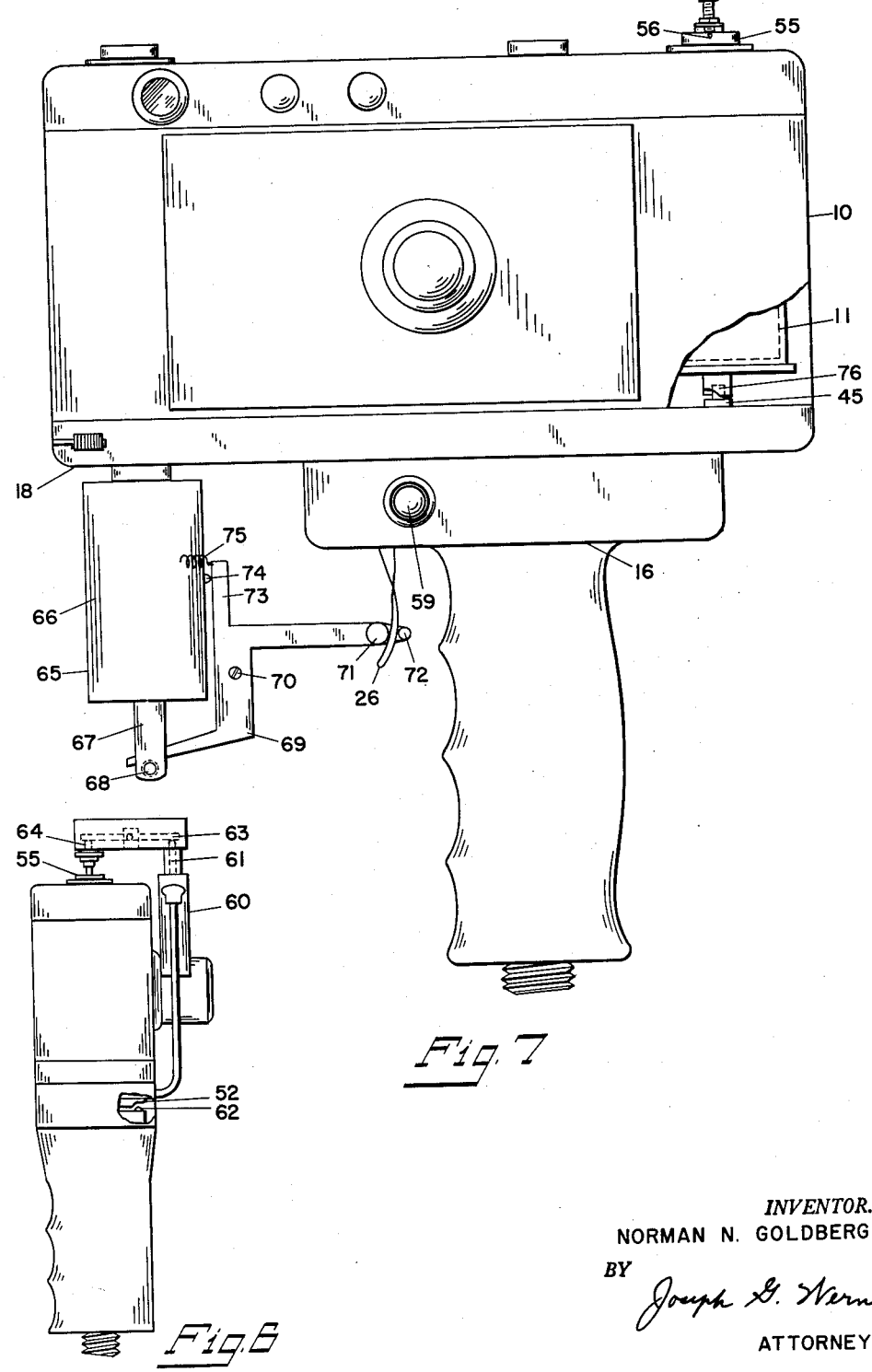

United States Patent Office 3,084,606
Patented Apr. 9, 1963

3,084,606
MOTORIZED DRIVE MECHANISM FOR ROLL FILM CAMERAS
Norman N. Goldberg, 1408 Baskerville Ave., Madison, Wis.
Filed Mar. 13, 1961, Ser. No. 95,243
6 Claims. (Cl. 95—31)

This invention relates to improvements in motorized drive mechanisms for roll film cameras.

It is a primary object of my invention to provide a motorized drive mechanism for a roll film camera which will permit both the successive exposure of a series of film segments to provide continuous sequence photographs and the intermixing of individual exposures whenever desired.

It is a further object of my invention to provide a motorized drive mechanism for a roll film camera which may be easily attached to the camera without requiring any camera modifications.

It is a still further object of my invention to provide a motorized drive mechanism for a roll film camera which will permit manual operation of the attached camera when desired.

Another object of my invention is to provide a motorized drive mechanism for a roll film camera in which the motor is not required to start under loaded conditions.

An additional object of my invention is to provide a motorized drive mechanism for a roll film camera which can be remotely controlled by an operator positioned at some distance from the camera.

Other objects and advantages of the invention will be apparent from the following detailed explanation taken in conjunction with the accompanying drawings wherein a preferred embodiment of the principles of the invention has been selected for exemplification.

In the drawings:

FIG. 6 is a side elevation view of a modification of my invention employing a shutter trip mechanism which includes a solenoid with a broken out section showing the contct switch device.

FIG. 7 is a partial rear elevation view of my invention adapted for remote control.

Figures 1, 8:
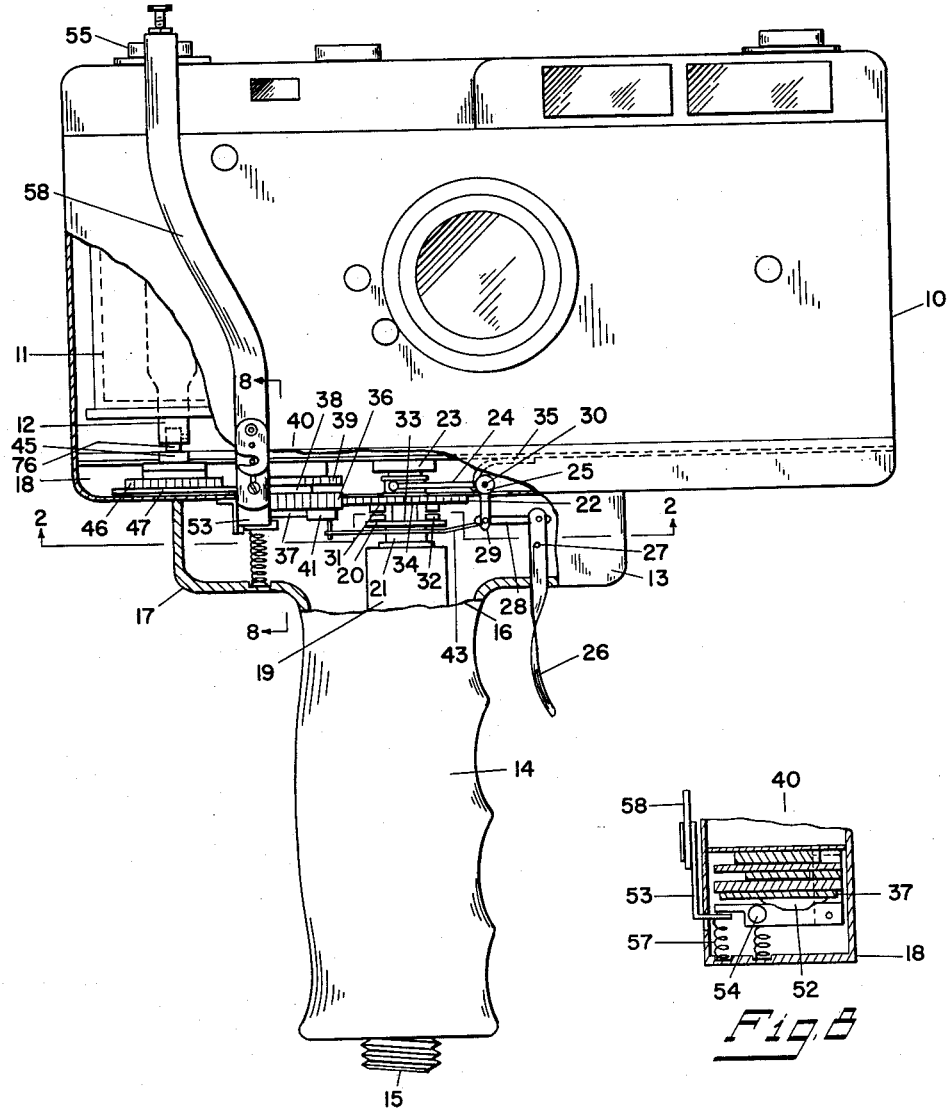
FIG. 1 is a front elevation view of my invention attached to a roll film camera with parts broken away.
FIG. 8 is a section view taken along line 8—8 of FIG. 1 showing the relation of the trip cam and the trip arm roller follower.

Referring more particularly to the drawings in which like numerals refer to like parts, the camera 10 illustrated in FIG. 1 is a standard roll film camera to which my motorized drive mechanism 13 is attached. The principal exterior elements of my invention are the handle 14 with an input end 15 and an output end 16 which serves as the motor housing, a control housing 17 attached to the output end 16 of the handle 14, and a gearcase 18 which is attached to the control housing 17. The gearcase 18 is attachable to the camera 10 in the same manner as a standard camera baseplate, and can be replaced by such a baseplate if the operator desires to operate the camera manually for an extended period.

Referring more specifically to the broken-out portion of FIG. 1, the motor 19 has a drive disc 20 attached to its drive shaft 21. A drive gear 22 is supported in slidable relation on base 23 by a pivotally attached yoke 24 having a hub 25 which is pinned to the gear case 18 in pivotable relation. The advantage of my sliding drive gear 22 is that the motor 19 may be started independently and be allowed to reach maximum speed and torque under no load. When the maximum motor speed and torque is reached, the operator pulls the trigger 26 toward the handle 14. The trigger 26 pivots on pin 27, and the connecting link 28 causes the attached yoke arm 29 to pivot toward the trigger 26. The yoke 24 pivots on the yoke pin 30 as the attached yoke arm 29 is pivoted, pushing the pivotally attached drive gear 22 downward and coupling it to the drive disc 20, causing rotation of the drive gear 22. Coupling of the drive disc 20 and drive gear 22 is preferably accomplished by the use of drive lugs 31, 32 located on the drive faces 33, 34 of the drive disc 20 and the drive gear 22 respectively, as shown in FIG. 1. However, suitable disc clutch variations may also be employed to form the coupling. A spring 35 is attached to the yoke 24 to raise the yoke and uncouple the drive disc 20 and drive gear 22 when the trigger 26 is released.

FIG. 1 further illustrates that the drive gear 22 is always in mesh with the driven gear 36, regardless of whether the drive gear 22 is coupled to the drive disc 20. Therefore, when the drive gear 22 is rotated, the driven gear 36 also rotates. The driven gear 36, the stop cam 37, the locking guide 38, and the intermittent gear 39 shown in FIG. 1 are all fastened together to form a gear stack 40, and rotation of the driven gear 36 causes rotation of the gear stack 40. A follower arm 41 is pivotally attached to the gear case 18 and connected by means of a connecting rod 43 to the yoke arm 29. When the gear stack 40 is not in rotation, the follower arm 41 engages the tapered slot 44 in the stop cam 37. When the trigger 26 is pulled, the connecting rod 43 causes the follower arm 41 to pivot on pivot screw 42 and disengage from the tapered slot 44 to permit stack rotation. The follower arm 41 is designed such that it pivots free from the tapered slot 44 of the stop cam 37 prior to the coupling of the drive disc 20 and drive gear 22 and, therefore, does not interfere with rotation of the stack 40. The function of the stop cam 37 and the follower arm 41 is to insure that the stack 40 will cease rotation at the same point in the stack rotation cycle, regardless of when the trigger 26 is released. It was previously mentioned that the function of the spring 35 is to raise the drive gear 22 and uncouple it from the drive disc 20. However, the follower arm 41 and connecting rod 43 are designed such that the yoke arm 29 cannot be pivoted back to the position shown in FIG. 2 until the follower arm 41 starts to engage the stop cam tapered slot 44, and only then will the spring 35 be able to uncouple the drive gear 22 from the drive disc 20. Therefore, once a rotation of the stack 40 has started the camera operator can release the trigger 26 at any time and the drive gear will remain coupled to the rotating drive disc until the follower arm 41 starts to engage the stop cam tapered slot 44. It is also apparent that as long as the operator continues to hold the trigger 26 in a depressed position, stack rotation will continue.

Referring again to the camera 10 of FIG. 1, it is necessary that the take-up spool shaft 12 be rotated after each exposure of the film 11 to position a new segment of film for the succeeding exposure. It is also essential that the spool shaft 12 and the film 11 remain stationary for the period of time during which an exposure is made. The output shaft 45 of my invention is detachably connected to the take-up spool shaft 12 of the camera. The driven gear 36, the locking guide 38, and the intermittent gear 39 which comprise the stack 40, together with the output gear 46 and locking plate 47 attached to the output shaft 45 all comprise transmission means 48 which convert the constant velocity rotation of the stack 40 into the required interrupted motion of the output shaft 45.

Figure 2:
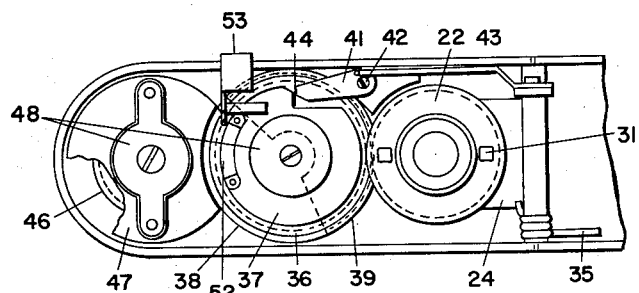
FIGS. 2, 3, 4 and 5 are section views taken on line 2—2 of FIG. 1 showing the relation of the elements of my invention at different points in the operating cycle.
Figure 3:
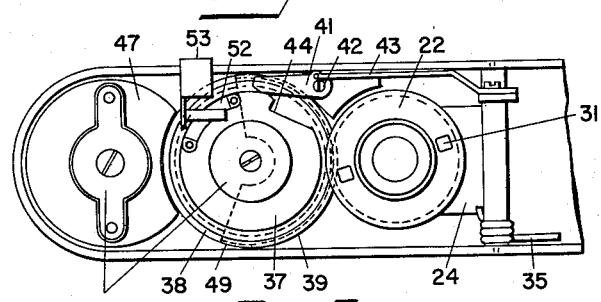
Figure 4:
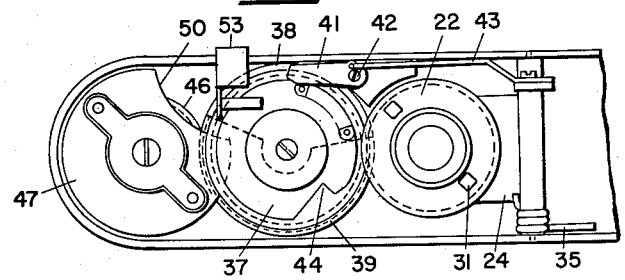

FIGS. 1 and 2 show that when the stack 40 is not in rotation, the intermittent gear 39 is not in mesh with the output gear 46. When the trigger 26 is pulled and the follower arm 41 is pivoted to permit the stack 40 to rotate, the convex locking surface 49 of the locking guide 38 mates with the concave locking surface 50 of the locking plate 47 in sliding relation to maintain the locking plate 47 and attached output shaft 45 in the stationary position shown in FIG. 3. As the stack 40 continues its rotation, the intermittent gear 39 is brought into mesh with the output gear 46, causing the output gear and attached output shaft 45 to rotate. Rotation of the output shaft causes rotation of the locking plate 47 and the mating convex and concave locking surfaces 49, 50 are separated, as shown in FIG. 4. It is important to note that the locking guide 38 and intermittent gear 39 are located in such relative position that the locking guide ceases to prevent rotation of the locking plate 47 at the same time as the intermittent gear 39 is brought into mesh with the output gear. The output gear 46 has a sufficient number of gear teeth to produce one revolution of the output shaft 45 each time it is in mesh with the intermittent gear 39. Each revolution of the output shaft 45 causes the connected camera take-up spool shaft 12 to rotate one revolution and position a new segment of the film 11 for exposure.

Figure 5:
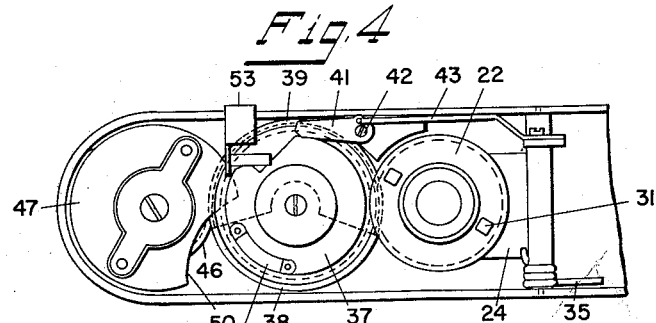

FIG. 5 shows the transmission means as the stack 40 nears the completion of its rotation cycle. The intermittent gear 39 is starting to pass out of mesh with the output gear 46, and the output shaft 45 is about to be locked in its stationary position by the mating surfaces 49, 50 of the locking guide 38 and locking plate 47. If the trigger 26 has been released during the rotation of the stack 40, the follower arm 41 will pivot into the stop cam tapered slot 44, as shown in FIGS. 1 and 2, and allow the spring 35 to uncouple the drive disc 20 and the drive gear 22. If the trigger 26 has not been released, the follower arm 41 cannot pivot into the tapered slot 44 and the drive gear 22 will remain coupled to the drive disc 20 and cause the stack 40 to begin another rotation cycle.

The preferred shutter trip mechanism is illustrated in FIGS. 1 and 8 and includes a trip cam 52 which is preferably mounted on the stop cam 37 of the stack 40, and a trip arm 53, which is in communication with the camera shutter release button 55. FIG. 3 illustrates the approximate position of the trip cam 52 and the stack 40 when the shutter is tripped. In that position, the output shaft 45 and the connected take-up spool shaft 12 are locked in stationary position by the locking guide 38 and locking plate 47, thus insuring that the camera film 11 will be stationary during exposure. The trip cam 52 depresses the trip cam follower 54 which is pivotally attached to the gear case 18 in communication with the trip arm 53. The trip arm 53 is attached to the gear case 18 in slidable relation, and when the trip cam follower 54 pushes the trip arm downward to the depressed position, the shutter button contact point 56, which may be adjustable as shown in FIG. 7, depresses the shutter release button 55 and the film 11 is exposed. After the shutter is tripped, the trip cam 52 is rotated out of contact with the trip cam follower 54 by the stack 40, and the arm return spring 57 returns the arm to its normal raised position. The trip arm preferably has a detachable upper portion 58 which can be easily detached to facilitate removal of the drive mechanism from the camera.

The drive motor 19 may consist of any suitable motor means, but a battery powered electric motor is preferable for portable use. The described motor 19 is controlled by a motor switch 59, which may be of the push button type illustrated in FIG. 7.

Operation of a roll film camera equipped with my invention is extremely easy. The operator must only raise the camera 10 to his eye, aim the camera at the picture subject, depress the motor switch 59 to start the motor 19 and pull the trigger 26. The camera will successively expose new film segments until the operator releases the trigger or until the film is completely exposed. When the operator releases the trigger 26, the transmission means 48 will come to rest in the stop position illustrated by FIGS. 1 and 2. The motor control switch 59 is then released to stop the motor. It is apparent that the camera is always ready to make an exposure at the end of each stack rotation cycle, so that the first exposure of any sequence is always made immediately after the trigger 26 is pulled. It is also apparent that the operator can take one exposure or take a series of sequence exposures and can inter-mix such exposures however he desires.

It should be noted that my invention in no way interferes with the normal camera counter mechanism. However, as an additional safety device, a ratchet counter mechanism could be installed in my invention in connection with the output shaft, with electrical means of automatically shutting off the motor when the last film segment has been exposed. It is also important to note that my invention in no way interferes with the normal manual operation of the camera. The operator can manually depress the upper portion 58 of the trip arm 53 which will cause the shutter release button 55 to be depressed and expose the film. The film 11 can then be manually wound in the normal manner and the take-up spool shaft 12 will slip past the output shaft 45, which preferably has a spring loaded connector end 76 which can be depressed into the main output shaft 45.

FIG. 6 shows an alternative shutter trip mechanism which employs a trip solenoid 60. When the stack 40 reaches the position illustrated in FIG. 3, the trip cam 52 depresses the contact switch 62 which causes the trip solenoid 60 to be energized. The solenoid power shaft 61 is driven upward, causing the transfer lever 63 to pivot and depress the push rod 64, which in turn depresses the shutter release button 55.

FIG. 7 shows my invention adapted for remote control operation. My remote control means 65 includes a solenoid 66, which is threadedly attached to the lower side of the gear case 18. A power lever 69, having a trigger contact roller 71 and a trigger roller follower 72 in contact with the trigger 26 is attached to the body of the solenoid 66 in pivotal relation. The power lever 69 is also in contact with the lever contact roller 68 carried by the retractable power shaft 67 of the solenoid 66. The power lever 69 also has an extension arm 73 which is in contact with a normally closed by-pass switch 74, located on the solenoid 66, which by-passes the motor control switch 59.

In remote operation, the operator, located at some distance from the camera 10, will energize the solenoid 66. As the power shaft 67 of the solenoid retracts, the lever contact roller 68 will bear on the power lever 69 and cause it to pivot on the pivot screw 70. As the power lever 69 starts to pivot, the extension arm 73 will release the by-pass switch 74, allowing it to close and start the drive motor 19. As the power lever 69 continues to pivot, the trigger contact roller 71 will bear on the trigger 26 and cause it to be depressed and operate the camera. When the solenoid 66 is de-energized, the power lever return spring 75 pulls the power lever 69 toward its original position. However, the trigger roller follower 72 is prevented by the trigger 26 from pivoting back to the position shown in FIG. 7, until rotation of the stack 40 ceases and the trigger 26 returns to the undepressed position. This prevents the extension arm 73 from opening the by-pass switch 74 and stopping the motor 19 until the drive gear 22 has been uncoupled from the drive disc 20 by the spring 35.

It is understood that the present invention is not confined to the particular construction and arrangement of parts herein illustrated and described, but embraces all such modified forms thereof, as may come within the scope of the following claims.

I claim:

1. A drive mechanism for a roll film camera comprising a motor drive unit operating at a substantially constant angular velocity, a drive gear located in coupleable relation to said motor drive unit, said motor drive unit comprising an electric motor controlled by means of a switch, a drive disc with a drive face attached to the output shaft of said motor in fixed relation, a plurality of driving lugs affixed to said drive face, said driving lugs engaging substantially similar driving lugs located on the drive face of said drive gear when said drive gear is coupled with said operating motor unit, lever means for coupling said drive gear and said drive unit, a spring for uncoupling said drive gear and said drive unit when said lever means are released, an output shaft adapted for detachable connection with a roll film camera take-up spool shaft, transmission means intermediate said output shaft and said drive gear whereby said output shaft will be alternately rotated and locked in stationary relation when said drive gear is coupled to said operating motor drive unit, a shutter trip mechanism adapted for communication with the shutter release button of an attached roll film camera, trip activator means attached to said transmission means for activating said shutter trip mechanism when said output shaft is locked in stationary relation by said transmission means.

2. A drive mechanism for a roll film camera comprising a motor drive unit operating at a substantially constant angular velocity, a drive gear located in coupleable relation to said drive unit, lever means for coupling said drive gear and said drive unit, a pivotable follower arm connected to said lever means, a spring for uncoupling said drive gear and said drive unit when said lever means are released, an output shaft adapted for detachable connection with a roll film camera take-up spool shaft, transmission means intermediate said output shaft and said drive gear whereby said output shaft will be alternately rotated and locked in stationary relation when said drive gear is coupled to said operating motor drive unit, a stop cam mounted on said transmission means, said stop cam engaging said follower arm such that said spring will be prevented from uncoupling said drive gear and said motor drive unit until said output shaft has completed a rotation and is locked in stationary position by said transmission means, a shutter trip mechanism adapted for communication with the shutter release button of an attached roll film camera, trip activator means attached to said transmission means for activating said shutter trip mechanism when said output shaft is locked in stationary relation by said transmission means.

3. A drive mechanism for a roll film camera comprising a motor drive unit operating at a substantially constant angular velocity, a drive gear located in coupleable relation to said drive unit, lever means for coupling said drive gear and said drive unit, a spring for uncoupling said drive gear and said drive unit when said lever means are released, an output shaft adapted for detachable connection with a roll film camera take-up spool shaft, transmission means intermediate said output shaft and said drive gear whereby said output shaft will be alternately rotated and locked in stationary relation when said drive gear is coupled to said operating motor drive unit, a shutter trip mechanism adapted for communication with the shutter release button of an attached roll film camera, trip activator means attached to said transmission means for activating said shutter trip mechanism when said output shaft is locked in stationary relation by said transmission means, said shutter trip mechanism containing a trip solenoid and said trip activator means consisting of a contact switch, said trip solenoid causing said mechanism to depress said shutter release button when said contact switch closes a circuit to said trip solenoid.

4. A drive mechanism for a roll film camera comprising a motor drive unit operating at a substantially constant angular velocity, a drive gear located in coupleable relation to said drive unit, lever means for coupling said drive gear and said drive unit, a remotely controlled means attached to said drive mechanism for operating said lever means, a spring for uncoupling said drive gear and said drive unit when said lever means are released, an output shaft adapted for detachable connection with a roll film camera take-up spool shaft, transmission means intermediate said output shaft and said drive gear whereby said output shaft will be alternately rotated and locked in stationary relation when said drive gear is coupled to said operating motor drive unit, a shutter trip mechanism adapted for communication with the shutter release button of an attached roll film camera, trip activator means attached to said transmission means for activating said shutter trip mechanism when said output shaft is locked in stationary relation by said transmission means.

5. In combination, a roll film camera having a film winding mechanism with an attached film roll, a drive mechanism comprising, a motor drive unit operating at a substantially constant angular velocity, a drive gear located in coupleable relation to said motor drive unit, said motor drive unit comprising an electric motor controlled by means of a switch, a drive disc with a drive face attached to the output shaft of said motor in fixed relation, a plurality of driving lugs affixed to said drive face, said driving lugs engaging substantially similar driving lugs located on the drive face of said drive gear when said drive gear is coupled with said operating motor drive unit, lever means for coupling said drive gear and said drive unit, a spring for uncoupling said drive gear and said drive unit when said lever means are released, an output shaft detachably connected to the take-up spool shaft of said camera, transmission means intermediate said output shaft and said drive gear whereby said output shaft and connected take-up spool shaft will alternately be rotated and locked in stationary relation when said drive gear is coupled to said operating motor drive unit, a shutter trip arm in communication with the shutter release button of said camera, a trip cam mounted on said transmission means whereby said shutter trip arm will be depressed to trip said shutter release button when said film winding mechanism is locked in stationary relation by said transmission means, said motorized drive mechanism causing said attached roll film camera to successively expose a series of film segments when said lever means are employed to couple said motor drive unit and said drive gear.

6. In combination, a roll film camera having a film winding mechanism with an attached film roll, a drive mechanism comprising, a motor drive unit operating at a substantially constant angular velocity, a drive gear located in coupleable relation to said motor drive unit, lever means for coupling said drive gear and said drive unit, a pivotable follower arm connected to said lever means, a spring for uncoupling said drive gear and said drive unit when said lever means are released, an output shaft detachably connected to the take-up spool shaft of said camera, transmission means intermediate said output shaft and said drive gear whereby said output shaft and connected take-up spool shaft will alternately be rotated and locked in stationary relation when said drive gear is coupled to said operating motor drive unit, a stop cam mounted on said transmission means, said stop cam engaging said follower arm such that said spring will be prevented from uncoupling said drive gear and said motor drive unit until said output shaft has completed a rotation and is locked in stationary position by said transmission means, a shutter trip arm in communication with the shutter release button of said camera, a trip cam mounted on said transmission means whereby said shutter trip arm will be depressed to trip said shutter release button when said film winding mechanism is locked in stationary relation by said transmission means, said motorized drive mechanism causing said attached roll film camera to successively expose a series of film segments when said lever means are employed to couple said motor drive unit and said drive gear.

References Cited in the file of this patent

UNITED STATES PATENTS

| | | |
|---|---|---|
| 2,160,818 | Becker | June 6, 1939 |
| 2,928,315 | Broido | Mar. 15, 1960 |

FOREIGN PATENTS

| | | |
|---|---|---|
| 239,222 | Switzerland | Dec. 17, 1945 |